United States Patent [19]

Scott, Jr. et al.

[11] 4,079,167

[45] Mar. 14, 1978

[54] CHEMICALLY POLISHED POLYCRYSTALLINE ALUMINA MATERIAL

[75] Inventors: Garland E. Scott, Jr., Willoughby; Michael K. Levenson, Cleveland Hts., both of Ohio

[73] Assignee: General Electric Company, Schenectady, N.Y.

[21] Appl. No.: 590,361

[22] Filed: Jun. 25, 1975

Related U.S. Application Data

[62] Division of Ser. No. 453,962, Mar. 22, 1974, Pat. No. 3,935,495

[51] Int. Cl.$^2$ .............................................. B32B 17/00
[52] U.S. Cl. .................................... 428/409; 428/410
[58] Field of Search ............... 428/409, 410; 423/625; 106/65; 156/2, 24; 313/220

[56] References Cited

U.S. PATENT DOCUMENTS

| | | | |
|---|---|---|---|
| 1,806,589 | 5/1931 | Espig et al. ............................ 156/2 |
| 2,510,219 | 6/1950 | Graham ................................ 428/543 |
| 3,026,177 | 3/1962 | Pierre et al. ......................... 423/625 |
| 3,026,210 | 3/1962 | Coble .................................. 423/625 |
| 3,042,566 | 7/1962 | Hardy .................................. 156/2 |
| 3,311,482 | 3/1967 | Klingler et al. ..................... 106/65 |
| 3,619,309 | 11/1971 | Faktor et al. ....................... 423/625 |
| 3,808,065 | 4/1974 | Robinson et al. ..................... 156/2 |
| 3,899,560 | 8/1975 | Sellers et al. ....................... 423/625 |

FOREIGN PATENT DOCUMENTS 1,034,122   6/1966   United Kingdom.

*Primary Examiner*—Marion E. McCamish
*Attorney, Agent, or Firm*—John F. McDevitt; Lawrence R. Kempton; Frank L. Neuhauser

[57] ABSTRACT

Increased optical transmission is provided for a body of light transmissive polycrystalline alumina body treated at elevated temperatures with a molten flux composition. A tube of the flux polished material which can be used as the light transmissive envelope for high intensity discharge lamps especially sodium vapor lamps, improves light output from the lamp as the result of increased in-line transmission for the treated envelope member. A method of chemically polishing polycrystalline alumina material in this manner is also disclosed.

4 Claims, 4 Drawing Figures

U.S. Patent  March 14, 1978  Sheet 1 of 2  4,079,167 ured that lamps utilizing the improved
CHEMICALLY POLISHED POLYCRYSTALLINE ALUMINA MATERIAL This is a division of application Ser. No. 453,962, filed Mar. 22, 1974 and now U.S. Pat. No. 3,935,495.

BACKGROUND OF THE INVENTION

The present invention relates to a transmissive body of high density polycrystalline alumina wherein the major surfaces have been polished with a molten fluxing agent to provide increased optical transmission. A tubular form of the flux polished material when used as the light transmissive envelope for an improved high intensity electric discharge lamp provides higher light-output than can be generally obtained with unpolished alumina material. The improved envelope material is particularly useful in high intensity sodium vapor lamp constructions of the type utilizing self heated electrodes, that is electrodes heated by the discharge and not by current from an external source.

High intensity sodium vapor lamps of the kind described in U.S. Pat. No. 3,248,590 — Schmidt, entitled "High Pressure Sodium Vapor Lamp", require the above type electrodes. These lamps further employ a slender tubular envelope of light-transmissive, high density, polycrystalline alumina material which is resistant to sodium a high temperatures. A particularly suitable high purity alumina of this type is described along with methods for its preparation in a U.S. Pat. No. 3,026,210 — Coble wherein said material exhibits an in-line transmission of not less than 0.5% per millimeter thickness of the tube for radiant energy of all wavelengths in the wavelength region from about 0.3 micron to about 6.6 microns with an in-line transmission of not less than 10% at some wavelength within said wavelength range. Such polycrystalline alumina material generally contains a small but effective amount up to 0.5 weight percent magnesia to provide optical transparency wherein the magnesia content can be present primarily as an alumina-magnesia spinel. The filling in such high intensity sodium vapor lamps comprises sodium along with a rare gas such as xenon to facilitate starting and mercury for improved efficiency. Both ends of the alumina tube are sealed by refractory metal closure members, suitably niobium end caps bonded to the alumina tube with a glassy sealing material. Each end cap supports an electrode extending along the axis of the tube such as a tungsten rod having a double coil of tungsten wire wound around its inner end and with the electrodes further being coated with a suitable electron emissive material. A lamp of this construction is further described in a U.S. Pat. No. 3,708,710 — Smyser et al., along with a suitable method of lamp fabrication, so that it becomes unnecessary to repeat such details in the present specification.

It is also known to chemically polish opaque polycrystalline alumina objects in a fused borax bath so that dislocations and grain boundaries are not preferentially etched. The observed effect with this technique was a smooth and highly reflective surface being produced on the alumina material. Improved mechanical strength resulted from such treatment which is described in the technical article entitled "Chemical Polish and Strength of Alumina", by A. G. King, published in Vol. 3, Materials Science Research (1966).

SUMMARY OF THE INVENTION

It has now been found, surprisingly, that optical transmission of a light transmissive polycrystalline alumina material as described in the aforementioned U.S. Pat. No. 3,026,210 Patent is also significantly increased by a flux polishing treatment and to such a degree that light output characteristics of high intensity electric discharge lamps utilizing the polished arc chambers are improved. The improvement thereby obtained in light-output for such lamps has been found superior compared with the same lamp using an arc chamber made with currently available polycrystalline type alumina material. The flux treatment apparently not only provides a smoother exterior surface having increased in-line transmission, but also increases the total optical transmission by removing a surface layer from the material. The end result is that lamps utilizing the improved polycrystalline alumina material of the present invention exhibit increased lumen per watt values to provide a more efficient light source.

DESCRIPTION OF THE PREFERRED EMBODIMENTS

Figure 1:
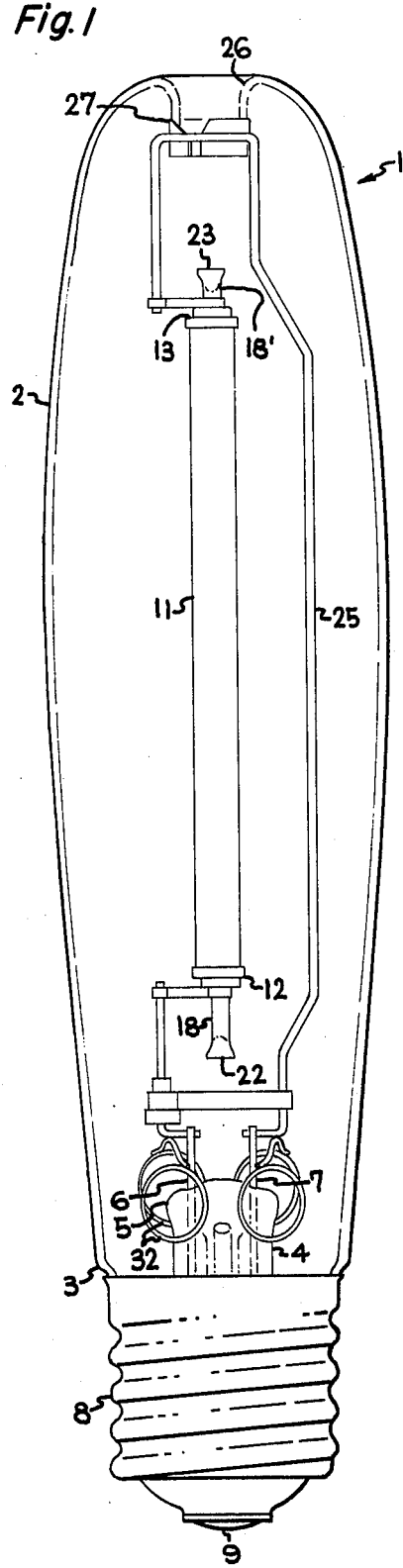
FIG. 1 is a schematic view of a jacketed high pressure sodium vapor lamp embodying the present invention.

A high intensity sodium vapor discharge lamp in which the invention may be embodied is illustrated at 1 in FIG. 1 and comprises an outer vitreous envelope or jacket 2 of elongated ovoid shape. The neck 3 of the jacket is closed by a re-entrant stem 4 having a press 5 through which extends stiff inlead wires 6 and 7 which are connected at their outer ends to the threaded shell 8 and center contact 9 of a conventional screw base.

The inner envelope or arc tube 11 is made of sintered high density polycrystalline alumina ceramic as described in the aforementioned U.S. Pat. No. 3,026,201 which has had the major surfaces chemically treated in accordance with the present invention to provide increased optical transmission by means more fully explained hereinafter. The ends of the tube are closed by thimble-like niobium metal end caps 12 and 13 which have been heremetically sealed to the alumina arc tube by means of a glassy sealing composition which is shown exaggerated in thickness at 14 in FIG. 4.

Figure 4:
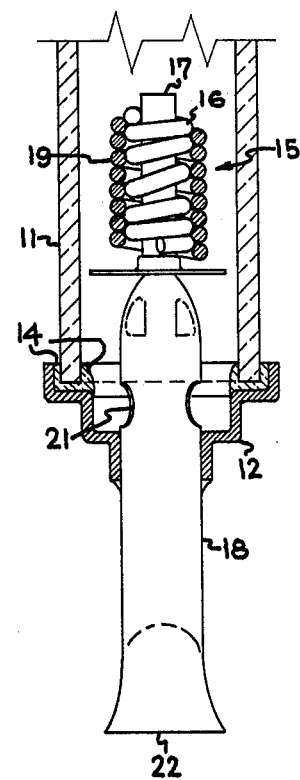
FIG. 4 is a sectional view of the electrode configuration for the lamp depicted in FIG. 1.

Thermionic electrodes 15 are mounted on the ends of the arc tube. As best seen in FIG. 4, the electrode comprises an inner tungsten wire coil 16 which is wound over a tungsten shank 17 crimped or welded in the end of a niobium tube 18 welded to the end cap. The central turns in the inner coil 16 are spread apart and the outer tungsten wire coil 19 is screwed over the inner coil. A suitable electron-emissive mix may be applied to the electrode coils by painting or alternatively by dipping the coils in the suspension. The material is retained primarily in the interstices between the turns of outer and inner coil and of inner coil and shank.

Lower tube 18 is pierced through at 21 and is used as an exhaust tube during manufacture of the lamp. After the gas filling and sodium mercury amalgam has been introduced into the arc tube, exhaust tube 18 is hermetically pinched off by a cold weld indicated at 22 and serves thereafter as a reservoir for condensed sodium mercury amalgam. Upper tube 18' has no opening in the arc tube and is used to contain a small amount of yttrium metal (not shown) which serves as a getter; the end of the tube is closed by a pinch 23 which need not be hermetic. The illustrated lamp is limited to base down operation wherein the longer exhaust tube 18, which must be the coolest portion of the arc tube for the amalgam to condense therein, is located lowermost.

The arc tube is supported within the outer envelope by means of a mount comprising a single rod 25 which extends the length of the envelope from inlead 7 at the stem end to a dimple 26 at the dome end to which it is anchored by a resilient clamp 27. End cap 13 of the arc tube is connected to the frame by band 29 while end cap 12 is connected to inlead 6 through band 30 and support rod 31. The inter-envelope space is desirably evacuated in order to conserve heat; that is done prior to sealing off the outer jacket. A getter, suitably barium-aluminum alloy powder pressed into channeled rings 32, is flashed after sealing in order to assure a high vacuum. A method of manufacturing this type lamp construction is further disclosed in aforementioned U.S. Pat. No. 3,708,710, hence need not be repeated in connection with the present invention.

Figure 2:
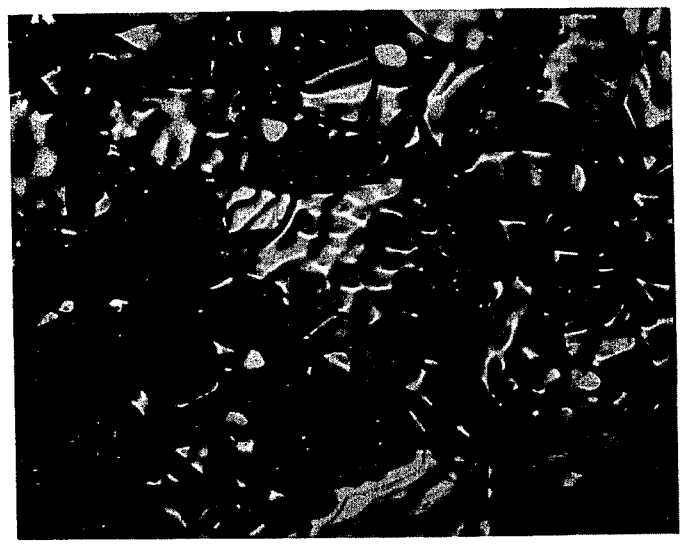
FIG. 2 is a photograph at 200 times magnification illustrating unpolished polycrystalline alumina.
Figure 3:
FIG. 3 is a photograph taken at the same magnification level of polished polycrystalline alumina material according to the present invention.

Basically, the present chemical polishing method comprises physically contacting the major surfaces of a light transmissive body of polycrystalline alumina with a molten inorganic flux that dissolves alumina at a moderate rate until the surface layer of said major surfaces has been dissolved to provide a relatively smooth appearance. It is important in carrying out this type of chemical polishing treatment that the flux composition also be selected so as to preferentially dissolve the surface layer of the alumina grains or particles rather than dissolve any material at the grain boundaries. It can be noted from a visual inspection of the treated alumina surface shown in FIG. 3 of the accompanying drawings as compared with an untreated surface shown in FIG. 2 that surface material is removed by the fluxing agent to provide a leveling or flattening action which reduces the high spots on the individual alumina particles without materially introducing low spots at the grain boundaries. From these photographs taken with reflected light, it can also be observed that the untreated surface in FIG. 2 gives the appearance of a "dark" field because of the large amount of light being scattered. The selection of particular flux compositions providing this preferential dissolving action can be made routinely by visibly inspecting the effect produced upon the treated alumina surfaces with a selected flux material which should remain stable in the molten condition at elevated temperatures of treatment up to around 1000° C. At more elevated temperatures, it has been observed that undesirable grain boundary etching can take place with the preferred sodium borate flux compositions and which further depends upon the time of contact.

Useful fluxing agents to provide a relatively smooth and flat surface in the foregoing manner should also not produce insoluble reaction products at the molten liquid interface which hinder the dissolving process or form an optical scattering surface having poor in-line transmission. The alkali metal salts provide a general class of useful flux compositions demonstrating the aforesaid thermal and chemical stability in a molten state. That class includes the alkali metal borates such as sodium borate and potassium borate, along with other type binary oxide systems having an alkali metal oxide constituent. Ternary oxide systems might also provide the desired uniform and moderate dissolving action although requiring more elevated temperatures to achieve a molten state than required for the preferred alkali metal borates. Thus, while it is preferred to carry out the dissolving action in air by immersing a polycrystalline body in the molten alkali metal borate bath at moderately elevated temperatures not exceeding approximately 1000° C so as not to encounter excessive volatilization of this fluxing agent, it is contemplated that more elevated temperatures or still other operating conditions can be employed because of the refractory nature of polycrystalline alumina. Employment of an alkali metal borate flux also produces a glassy coating upon the treated alumina body requiring subsequent removal for improved in-line transmission. The coating can be dissolved by washing the treated member in a dilute acid solution after it has been removed from the molten flux bath and cooled. It is also desirable to minimize thermal shock when the treated member is first removed from the molten flux bath which can be provided in conventional fashion by controlled cooling to ambient temperatures.

A specific example of the preferred treatment process according to the present invention wherein an alkali metal borate compound is employed as a fluxing agent, will now be given. A number of polycrystalline alumina tube samples were immersed in a sodium borate melt for various time periods at elevated temperatures in the range from about 762° C to 857° C to measure the effect upon total optical transmission of the chemical polishing treatment. A eutectic composition of the sodium borate salt was employed which can be represented by the general chemical formula $Na_2O.2.28B_2O_3$, although it has been found that other compositions having a molar ratio range up to four moles $B_2O_3$ per one mole $Na_2O$ can be used without significantly affecting the desired result. Time and temperature conditions were varied during treatment in this manner and the in-line transmission improvements obtained thereby are reported in tabular form below. The optical transmission measurements were conducted over the visible light spectrum with a Beckman Model DB spectrophotometer using a method described in the above referenced U.S. Pat. No. 3,026,210 patent and the average values obtained at different treatment conditions are listed in Table I below.

TABLE I

| Temperature (° C) | Time (Min.) | Transmission Increase (%) |
|---|---|---|
| 900 | 10 | 60 |
| " | 5 | 50 |
| " | 2 | 57 |
| 850 | 10 | 58 |
| " | 5 | 55 |
| " | 2 | 52 |
| 800 | 10 | 57 |
| " | 5 | 57 |
| " | 2 | 53 |
| 750 | 10 | 15 |
| " | 5 | 31 |
| " | 2 | 10.5 |

It will be apparent from the above optical transmission results that a substantial improvement is obtained compared with unpolished alumina tubes and more improvement takes place at longer times and higher temperatures. On the other hand, it should be kept in mind that preferential etching at the grain boundaries has been experienced with this fluxing agent when the treatment temperature exceeds approximately 1000° C. It was also necessary before conducting the above reported optical measurements to remove a vitreous coating on the treated surfaces which had been produced by the molten fluxing action. The treated arc chambers were washed in a dilute mineral acid solution to dissolve this coating after having been allowed to cool under ambient conditions following their removal from the molten flux bath.

A number of 400-watt size high pressure sodium vapor lamps utilizing the construction previously described were produced with the flux polished arc chambers for comparison with lamps having arc chambers of unpolished polycrystalline alumina. An average 117.7-lumens-per-watt output was obtained by conventional measurement upon 28 lamps constructed with the unpolished arc chambers. In comparison therewith, an average 120.5-lumens-per-watt output was obtained upon 14 lamps fabricated with the flux polished arc chambers which represents a measurable improvement attributable to the present invention.

It will be apparent from the foregoing description that various modifications can be employed to obtain the benefits of the present invention. For example, various modifications can be made in the chemical polishing treatment with comparable results such as by conducting the polishing in a neutral atmosphere rather than air. Likewise, different processing steps can be employed to remove residual coatings adhering to the major surfaces of the polycrystalline alumina body after contact with the molten flux than above described. It is intended to limit the present invention, therefore, only to the scope of the following claims.

What we claim and desire to secure by Letters Patent of the United Sates is:

1. As an article of manufacture, a high density, polycrystalline alumina body having flux polished major surfaces so as to reduce the high spots on the individual exterior alumina crystals without materially introducing low spots at the grain boundaries and thereby to obtain increased optical transmission upon flux removal.

2. An article of manufacture as in claim 1 wherein the polycrystalline alumina comprises high purity alumina having an in-line transmission of not less than 0.5% per millimeter thickness of said alumina body, for radiant energy of all wavelengths in a wavelength range from about 0.3 micron to about 6.6 microns and having an in-line transmission of not less than 10% at some wavelength within said wavelength range.

3. An article of manufacture as in claim 1 wherein the polycrystalline alumina comprises high purity alumina containing a small but effective amount up to 0.5 weight percent magnesia.

4. An article of manufacture as in claim 3 wherein the magnesia content is present primarily as an alumina-magnesia spinel.

* * * * *